(12) United States Patent
Katano

(10) Patent No.: US 8,836,693 B2
(45) Date of Patent: Sep. 16, 2014

(54) IMAGE PROCESSING APPARATUS AND IMAGE PROCESSING PROGRAM

(75) Inventor: Tetsu Katano, Tokyo (JP)

(73) Assignee: Kabushiki Kaisha Sega, Tokyo (JP)

(*) Notice: Subject to any disclaimer, the term of this patent is extended or adjusted under 35 U.S.C. 154(b) by 1481 days.

(21) Appl. No.: 12/227,207

(22) PCT Filed: May 9, 2007

(86) PCT No.: PCT/JP2007/000498
§ 371 (c)(1),
(2), (4) Date: Sep. 14, 2009

(87) PCT Pub. No.: WO2007/129477
PCT Pub. Date: Nov. 15, 2007

(65) Prior Publication Data
US 2012/0092325 A1    Apr. 19, 2012

(30) Foreign Application Priority Data
May 9, 2006  (JP) .................................. 2006-130898

(51) Int. Cl.
| G06T 15/00 | (2011.01) |
| G06T 13/00 | (2011.01) |
| G06K 9/00 | (2006.01) |
| G06T 15/20 | (2011.01) |
| A63F 13/40 | (2014.01) |

(52) U.S. Cl.
CPC ......... *A63F 13/10* (2013.01); *A63F 2300/6684* (2013.01); *A63F 2300/6661* (2013.01); *G06T 15/20* (2013.01)
USPC ........... 345/419; 345/427; 345/473; 345/474; 382/154; 348/39; 348/42; 463/31; 463/32

(58) Field of Classification Search
None
See application file for complete search history.

(56) References Cited

U.S. PATENT DOCUMENTS

| 6,256,040 B1 | 7/2001 | Tanaka et al. |
| 6,323,895 B1* | 11/2001 | Sata ................................ 348/39 |
| 7,264,547 B1 | 9/2007 | Norimatsu |
| 7,612,777 B2 | 11/2009 | Nagata et al. |
| 2004/0208358 A1* | 10/2004 | Tooyama et al. ............. 382/154 |
| 2005/0195184 A1* | 9/2005 | Yoshiike ....................... 345/419 |

FOREIGN PATENT DOCUMENTS

| JP | 11-075766 | 3/1999 |
| JP | 2001-079260 | 3/2001 |
| JP | 2002-163676 | 6/2002 |
| JP | 2003-135844 | 5/2003 |
| JP | 2005-326989 | 11/2005 |
| JP | 2006-004440 | 1/2006 |

OTHER PUBLICATIONS

Sega: "Panzer Dragoon: Orta", Xbox Instruction Manual, Sega, 2003.
wikipedia.org: "Panzer Dragoon Orta", Aug. 2, 2010.

\* cited by examiner

*Primary Examiner* — Tize Ma
(74) *Attorney, Agent, or Firm* — Jordan and Hamburg LLP

(57) ABSTRACT

A course CR is set in a virtual space SP along which a player character CH can move. The player character moves freely on the course, as long as it does not run off the course. In the course, a reference moving path is set indicating a standard moving path of the player character. A camera path of a virtual camera is set along the reference moving path. In the reference moving path, a object corresponding position (CP) is determined corresponding a position (CH(X,Y,Z)) of the player character in the virtual space. A position corresponding to the object corresponding position and a photographing condition are determined for the virtual camera.

16 Claims, 12 Drawing Sheets

$$c1 = a \times \cos\theta$$
$$\cos\theta = \frac{a^2 + c^2 - b^2}{2bc}$$
$$Ls = Li + c1$$

IMAGE PROCESSING APPARATUS AND IMAGE PROCESSING PROGRAM

BACKGROUND OF THE INVENTION

The present invention relates to an image processing apparatus and program for controlling a virtual camera which depicts images in a virtual space.

In recent years, since game machines have higher and higher performance, games are executed generally on a stage of three dimensional virtual space rather than the conventional two dimensional virtual plane. At the same time, output of a more effective image is required with less calculation load.

In accordance with a conventional depiction manner of three dimensional virtual space, for example, a coordinate of a virtual camera is set so that the virtual camera is positioned behind or on a side of a player character for displaying the player character moving at full speed within the virtual space. The virtual camera follows the movement of the player character and a situation substantially in front of or on a side of the player character.

In another manner, the coordinate of the virtual camera is fixed in the virtual space. And a view direction vector of the virtual camera is occasionally rotated following to the movement of the player character, or the view angle is changed. Therefore, a picture including the player character is displayed.

The former conventional approach has a problem that the virtual camera is buried in a wall when the player character approaches a hazard, such as the wall at the back, and no image can be displayed.

The latter conventional manner has a problem that a situation to be observed by a player is not necessarily displayed. Visual effect by moving the camera synchronous to the game progress is impossible.

The present invention is invented so as to solve such conventional problems and has an object to express sufficiently the situation of an object moving in a virtual space and to display dynamic images.

SUMMARY OF THE INVENTION

An image processing apparatus according to the present invention comprises a virtual space generating means for generating a virtual space, an object generating means for generating an object in said virtual space, a reference moving path generating means for generating a reference moving path of said object, a virtual camera generating means for generating a virtual camera which defines a display image of said virtual space, a movement operation means for moving said object substantially along said reference moving path in said virtual space, a corresponding position calculating means for calculating a position (called "an object corresponding position") on said reference moving path corresponding to a position of said object, and a virtual camera setting means for setting a position and photographing situation of said virtual camera corresponding to said object corresponding position.

Therefore, the situation of an object moving in a virtual space is sufficiently expressed and dynamic images are displayed.

In an image processing apparatus according to present invention, for example, said virtual camera setting means sets said position of said virtual camera along a continuous camera path corresponding at least partially to said object corresponding position, or sets said position of said virtual camera discontinuously, with setting said position of said virtual camera for predetermined intervals of at least a part of said object corresponding positions.

In an image processing apparatus according to the present invention, said virtual camera setting means may comprise a first angle setting means for setting an optical axis and a rotatory angle (called "first rotatory angle") around a coordinate axis (called "first coordinate axis") perpendicular to said reference axis, a second angle setting means for setting a rotatory angle (called "second rotatory angle") around a coordinate axis (called "second coordinate axis") perpendicular to said optical axis of said virtual camera and parallel to said reference axis, a third angle setting means for setting a rotatory angle (called "third rotatory angle") around a coordinate axis (called "third coordinate axis") perpendicular to said first and second coordinate axes, and an inclination setting means for setting an inclination of said reference axis in said virtual space.

Therefore, various forms of expression, such as an image expression inclined relative to the moving path, are possible.

In an image processing apparatus according to the present invention, said virtual camera setting means may further comprise a view angle setting means for setting a view angle of said virtual camera.

An image processing program and method according to the present invention comprises a virtual space generating step for generating a virtual space, an object generating step for generating an object in said virtual space, a reference moving path generating step for generating a reference moving path of said object, a virtual camera generating step for generating a virtual camera which defines a display image of said virtual space, a movement operation step for moving said object substantially along said reference moving path in said virtual space, a corresponding position calculating step for calculating a position (called "an object corresponding position") on said reference moving path corresponding to a position of said object, and a virtual camera setting step for setting a position and photographing situation of said virtual camera corresponding to said object corresponding position.

Therefore, the situation of an object moving in a virtual space is sufficiently expressed and dynamic images are displayed.

In said virtual camera setting step of an image processing program according to the present invention, said position of said virtual camera is set along a continuous camera path corresponding at least partially to said object corresponding position. Or said position of said virtual camera is discontinuously set, with said position of said virtual camera being set for predetermined intervals of at least a part of said object corresponding positions.

In said virtual camera setting step comprises of an image processing program according to the present invention may comprises a first angle setting step for setting an optical axis and a rotatory angle (called "first rotatory angle") around a coordinate axis (called "first coordinate axis") perpendicular to said reference axis, a second angle setting step for setting a rotatory angle (called "second rotatory angle") around a coordinate axis (called "second coordinate axis") perpendicular to said optical axis of said virtual camera and parallel to said reference axis, a third angle setting means for setting a rotatory angle (called "third rotatory angle") around a coordinate axis (called "third coordinate axis") perpendicular to said first and second coordinate axes, and an inclination setting step for setting an inclination of said reference axis in said virtual space.

Therefore, various forms of expression, such as an image expression inclined relative to the moving path, are possible.

In an image processing apparatus according to the present invention, said virtual camera setting step may further comprise a view angle setting step for setting a view angle of said virtual camera.

According to the present invention, the situation of an object moving in a virtual space is sufficiently expressed and dynamic images are displayed.

Next, embodiments of a controller and an input signal processing program according to the present invention are described with reference to the drawings.

DETAILED DESCRIPTION OF THE INVENTION

Figure 1:
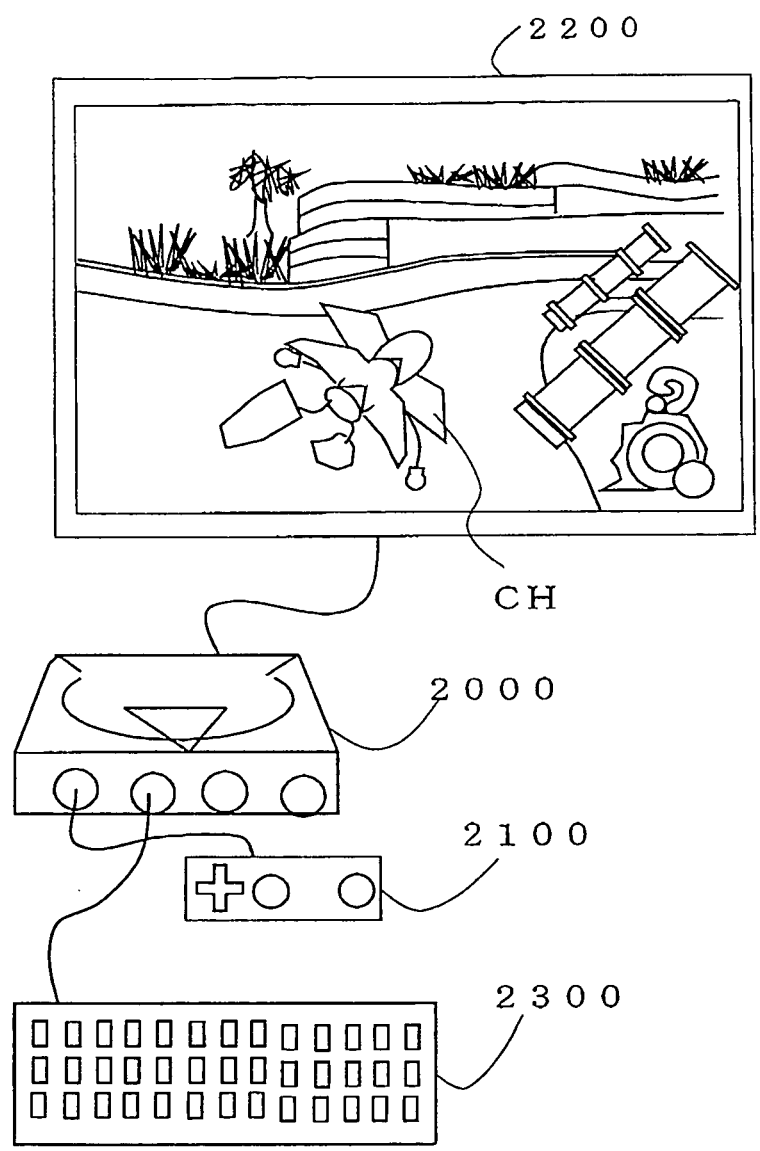
FIG. 1 is an elevational view showing an embodiment of an image processing apparatus according to the present invention applied to a game machine.
Figure 2:
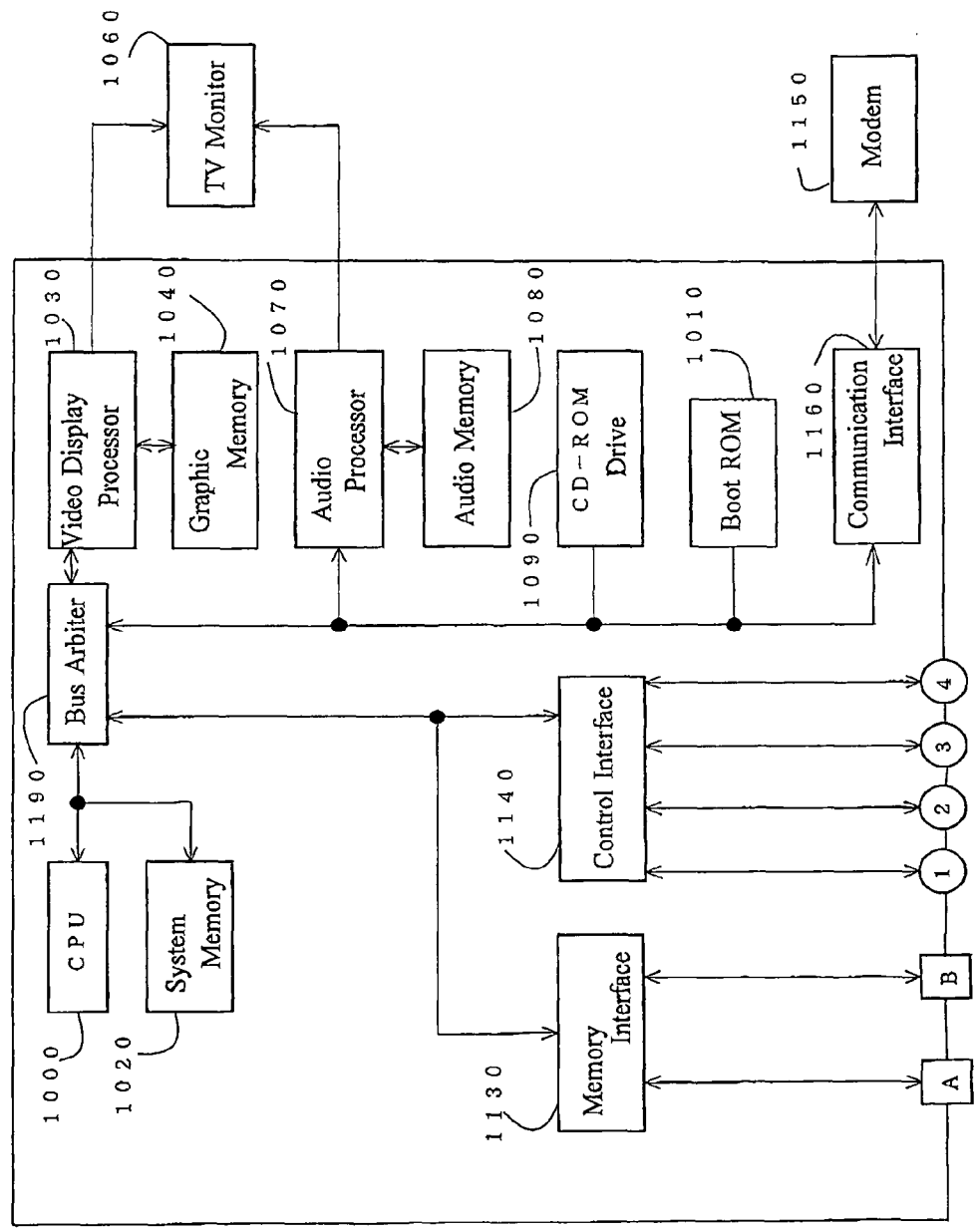
FIG. 2 is a block diagram showing the game machine in FIG. 1.

FIG. 1 is an elevational view showing an embodiment of an image processing apparatus according to the present invention applied to a game machine, and FIG. 2 is a block diagram showing the game machine in FIG. 1.

In FIG. 1, a game machine (information processing apparatus) 2000 is connected with a controller, a display device, such as a TV monitor 2200 and a key-board 2300.

On the display device 2200, an object CH such as a player character and scene around the character is shown. The object CH is operated and moved by the controller.

In FIG. 2, the game machine (image processing apparatus) 2000 includes a CPU for controlling totally the game machine, a boot ROM in which a program for starting up the game machine 2000 is stored and a system memory 1020 in which a program executed by the CPU 301 and data are stored.

The game machine 2000 is provided with a video processor 1030 for generating and controlling images to be displayed and a graphic memory 1040 for storing images to be generated and sources of the images. The video processor 1030 displays the generated images on the display device 2200.

The game machine 2000 is provided with an audio processor 1070 for generating sound and an audio memory 1080 for storing sound data to be generated. The audio processor 1070 generates a digital signal of a sound according to the stored data in the audio memory 1080 and outputs the sound from a speaker and head phone (not shown).

The game machine 2000 is provided with a CD-ROM drive 1090 as a memory device for game programs and data. The program and data stored in the memory medium set in the memory device are read into the system memory 1020, graphic memory 1040 and audio memory 1080.

The game machine 2000 is provided with a memory interface 1030 by which a player can read from and write into memory cards A and B. Therefore, game result of each user and situation of games interrupted midway can be registered.

The game machine 2000 is provided with a MODEM 1150 connected through a communication interface 1160. A network game can be executed by a plurality of game machines 2000 through the network. A statistics of game result, a ranking of players, various events and various information concerning the game can be obtained by a server (not shown).

The game machine 2000 is provided with a controller interface 1140 having terminals 1 to 4 to which the controller 2100 is connected.

Next, a player characters (object) CH and a moving path of a virtual camera CM are described.

Figure 3:
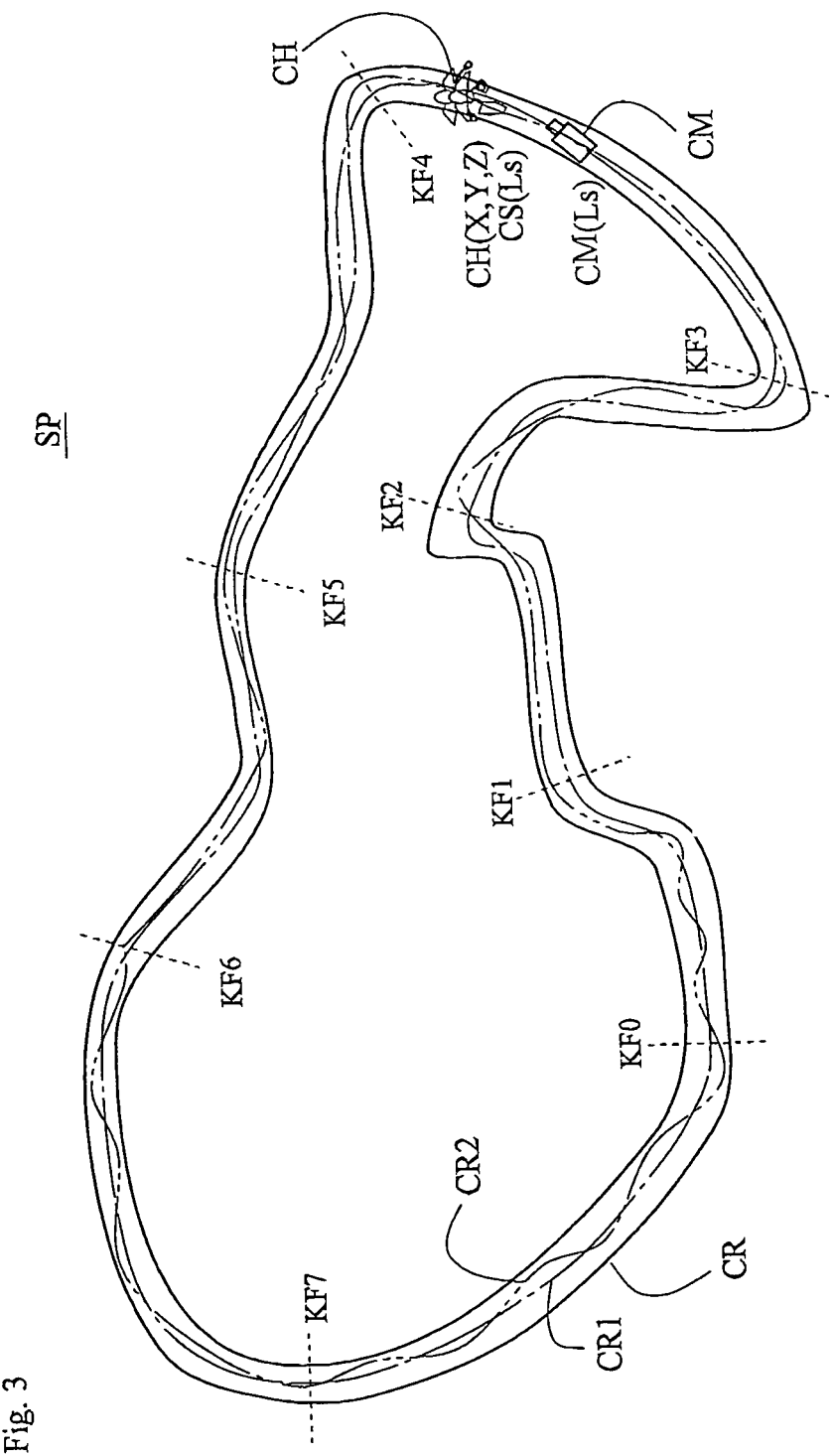
FIG. 3 is a plan view showing moving situation of a player character and a virtual camera in a game executed on the game machine in FIG. 1.
Figure 4:
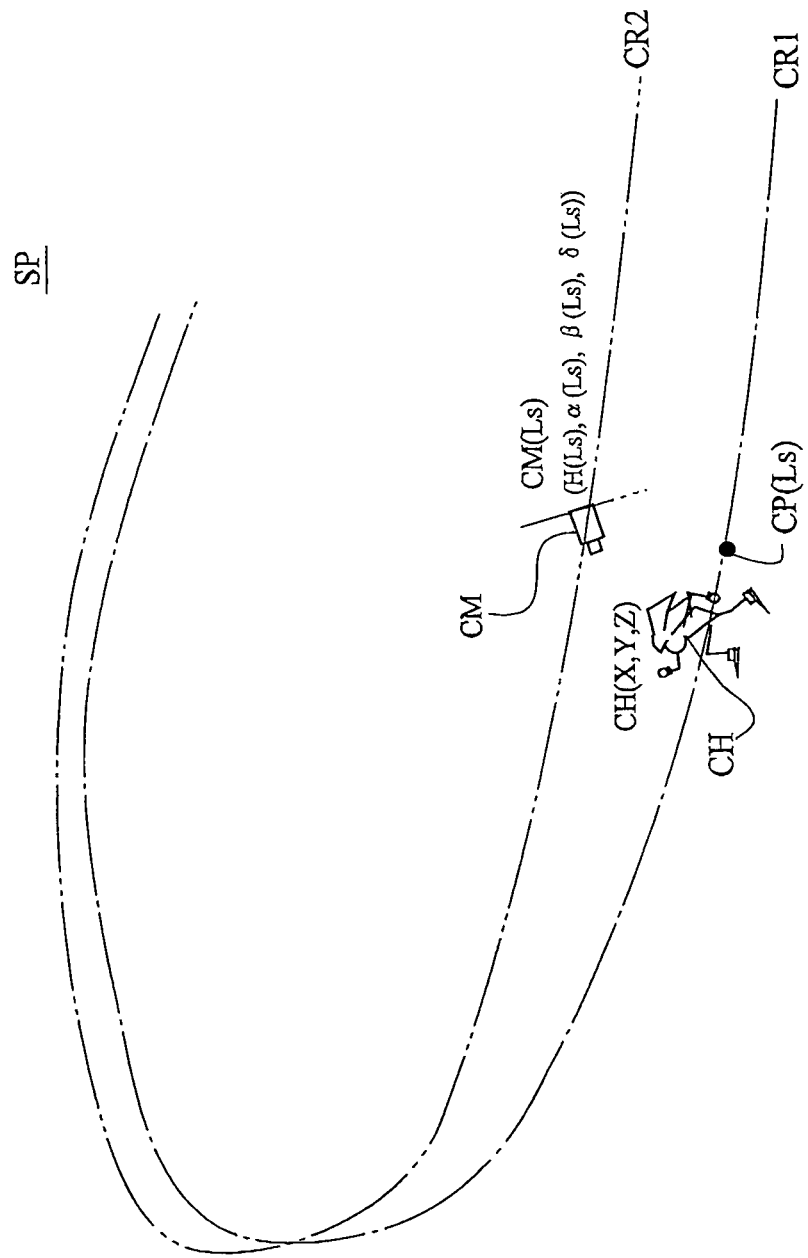
FIG. 4 is an elevational view showing moving situation of a player character and a virtual camera in a game executed on the game machine in FIG. 1.
Figure 5:
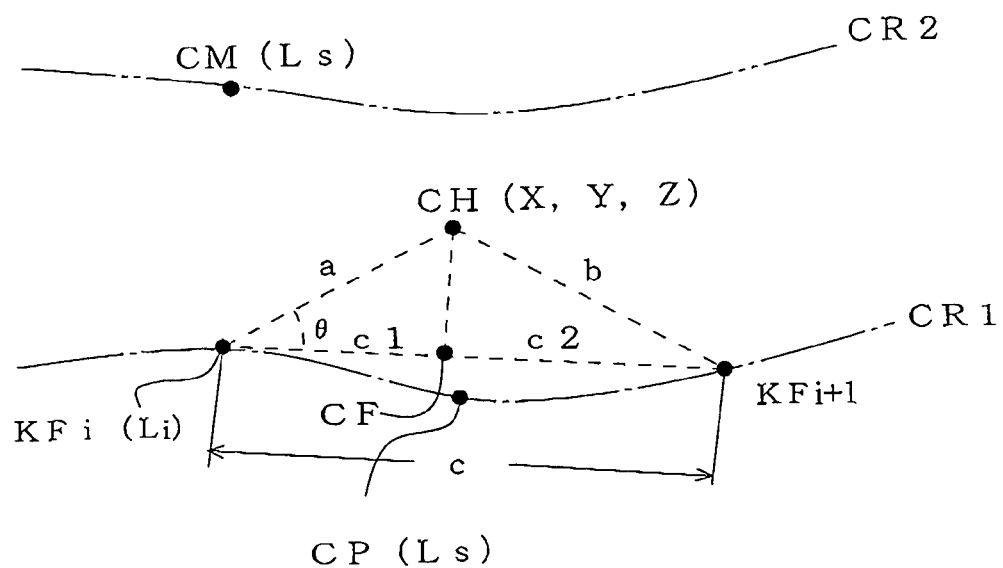
FIG. 5 is a figure showing a calculation method of corresponding position.

FIG. 3 is a plan view showing moving situation of a player character and a virtual camera in a game executed on the game machine in FIG. 1, FIG. 4 is an elevation view showing moving situation of a player character and a virtual camera in a game executed on the game machine in FIG. 1, and FIG. 5 is a figure showing a calculation method of corresponding position.

A course CR is set in a virtual space SP, on which a player character (object) CH moves. The player character freely moves on the course as far as the player character does not run off the course CR.

In the course CR, a reference moving path CR1 indicating standard moving path of the player character CH. A camera path CR2 is set for a virtual camera CM, along the reference moving path CR1.

The player can move the player character CH forward and backward along the course CR, and widthwise in the course CR, and vertically in the virtual space SP, for example.

On the reference moving path CR1, an object corresponding position CP is decided corresponding to a position CH(X, Y,Z) of the player character CH in the virtual space SP. The virtual camera CM is set at a position CM corresponding to the object corresponding position CP and is set in photographing condition.

The object corresponding position CP is a point on the reference moving path CR1 nearest from the position CH(X, Y,Z) of the player character CH, for example.

On the reference moving path CR1, a plurality of course reference coordinates KF0 to KF7 are usually set as representative positions for photographing the player character CH. A path length Li from the start position KF0 to each course reference coordinate KFi is predetermined. And three dimensional coordinate of each course reference coordinate KFi is predetermined. The object corresponding position CP is determined by the path length Ls along the reference moving path CR1 from the course reference coordinate KF1.

In this case, as shown in FIG. 5 for example, the object corresponding position CP is calculated according to a path length from KF1 to a cross point of a perpendicular line with a line connecting KFi and KFi+1, which perpendicular line is drawn from the position CH(X,Y,Z) to the line connecting KFi and KFi+1.

Here, the following parameters are defined.

Li: a path length from the course reference coordinate KF0 to the course reference coordinate KFi.

Ls: a path length from the course reference coordinate KF0 to the object corresponding position CP.

a: a distance from the position CH(X,Y,Z) to the course reference coordinate KFi.

b: a distance from the position CH(X,Y,Z) to the course reference coordinate KFi+1.

c: a distance between the course reference coordinates KFi and KFi+1.

c1: a distance from the course reference coordinates KFi to the cross point CF of the perpendicular line.

c2: a distance from the cross point CF of the perpendicular line to the course reference coordinates KFi+1.

θ: an angle between a line connecting the position CH(X, Y,Z) and the course reference coordinate KFi, and a line connecting the course reference coordinates KFi and KFi+1.

And approximately, $$Ls = Li + c1 \quad \text{formula (1)}$$

Is defined. And c1 is calculated from the distances a, b and c and the following formulae (2) and (3).

$$c1 = a \times \cos\theta \quad \text{formula (2)}$$

$$\cos\theta = (a^2 + b^2 + c^2)/2bc \quad \text{formula (3)}$$

Therefore, the position CM(Ls) of the virtual camera CM is determined and predetermined photographing condition is applied.

Figure 6:
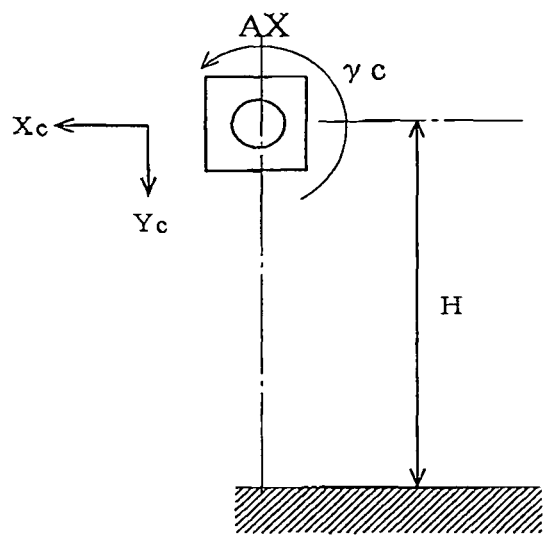
FIG. 6 is an elevation view showing parameters of the virtual camera in the game executed on the game machine in FIG. 1.
Figure 7:
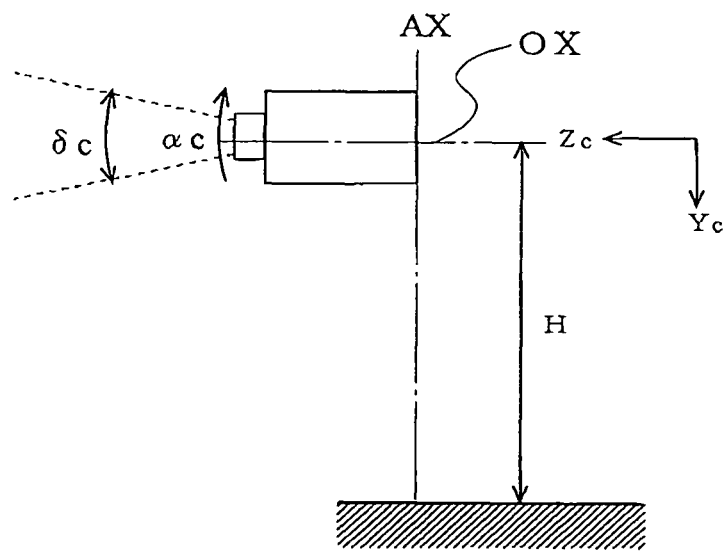
FIG. 7 is a right side view showing parameters of the virtual camera in the game executed on the game machine in FIG. 1.
Figure 8:
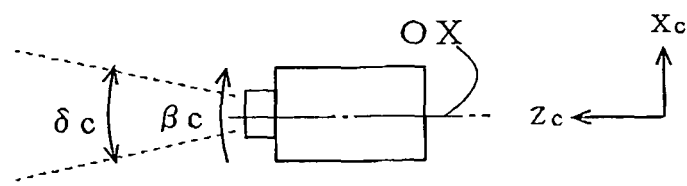
FIG. 8 is a plan view showing parameters of the virtual camera in the game executed on the game machine in FIG. 1.
Figure 9:
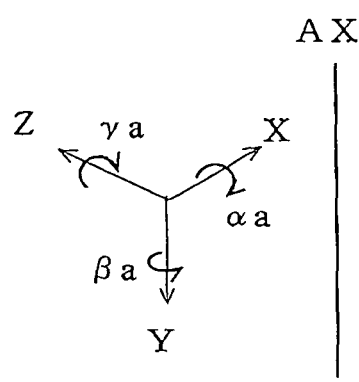
FIG. 9 is a perspective view showing reference axis parameters of the virtual camera in the game executed on the game machine in FIG. 1.

FIG. 6 is an elevational view showing parameters of the virtual camera in the game executed on the game machine in FIG. 1, FIG. 7 is a right side view showing parameters of the virtual camera in the game executed on the game machine in FIG. 1 and FIG. 8 is a plan view showing parameters of the virtual camera in the game executed on the game machine in FIG. 1.

As shown in FIGS. 6 to 9, the photographing condition is determined by setting a reference axis AX of rotation of an optical axis OX of the virtual camera CM. And the following parameters are defined.

H: a height of the virtual camera CM when the reference axis AX is parallel to Y-axis of the virtual space. For example, the height is measured from the ground of the course CR.

Xc: a coordinate axis perpendicular to the reference axis AX and the optical axis OX. (1st coordinate axis, hereafter)

Yc: a coordinate axis perpendicular to the optical axis OX and parallel to the reference axis AX. (2nd coordinate axis, hereafter)

Zc: a coordinate axis perpendicular to the coordinate axes Xc and Yc. (3rd coordinate axis, hereafter)

αc: a rotational angle of the virtual camera CM around the Xc axis. (1st rotational angle, hereafter)

βc: a rotational angle of the virtual camera CM around the Yc axis. (2nd rotational angle, hereafter)

γc: a rotational angle of the virtual camera CM around the Zc axis. (3rd rotational angle, hereafter)

δc: a view angle of the virtual camera.

αa: a rotational angle of the reference axis AX around the X-axis of the virtual space.

βa: a rotational angle of the reference axis AX around the Y-axis of the virtual space.

γa: a rotational angle of the reference axis AX around the Z-axis of the virtual space.

The photographing condition of the virtual camera CM is determined so that the most effective image expression is realized at each corresponding position CP. Since the potion CH(X,Y,Z) corresponding to the corresponding position CP is adjacent to the corresponding position CP, sufficiently effective image expression is obtained.

There are parameters of rotational angle of the reference axis AX for determining the photographing condition, so the expression of swinging of the reference axis AX is possible. Therefore, the condition is variously changed.

Figure 10:
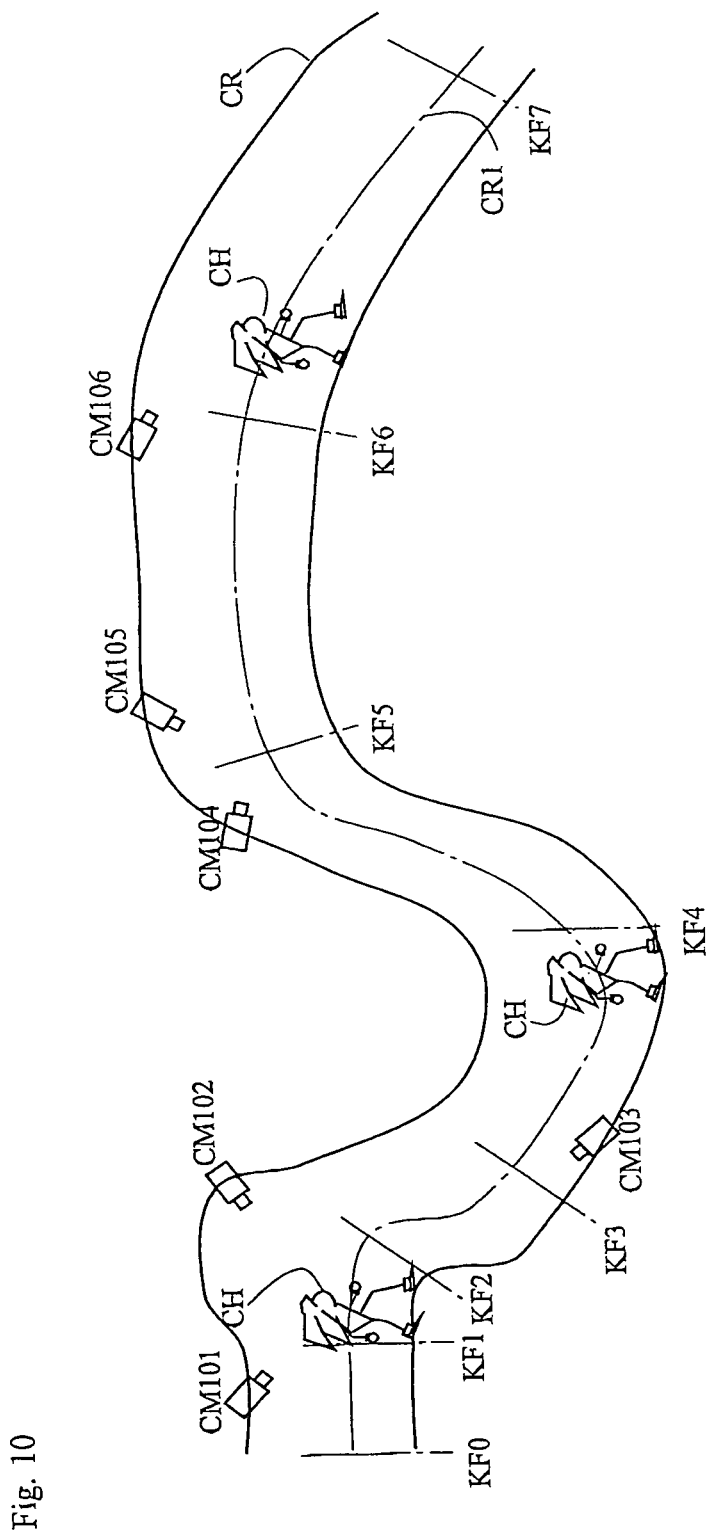
FIG. 10 is an elevational view showing another moving situation of a player character and a virtual camera in a game executed on the game machine in FIG. 1.

As for the course CR in FIG. 10, the camera path CR2 of the virtual camera CM may not be continuous along the reference moving path CR1 but discontinuously positioned for predetermined areas of the reference moving path CR1 of the player character. For example, the camera path CR2 is set so that ranges between the course reference coordinates KF0 and KF1, between the course reference coordinates KF1 and KF2, between the course reference coordinates KF2 and KF3, between the course reference coordinates KF3 and KF4, between the course reference coordinates KF4 and KF5, between the course reference coordinates KF5 and KF6, and between the course reference coordinates KF6 and KF7, are photographed by fixed cameras CM102, CM101, CM103, CM101, CM1105, CM104 and CM106, respectively. The above parameters are variously set corresponding to the camera path CR2.

Figure 11:
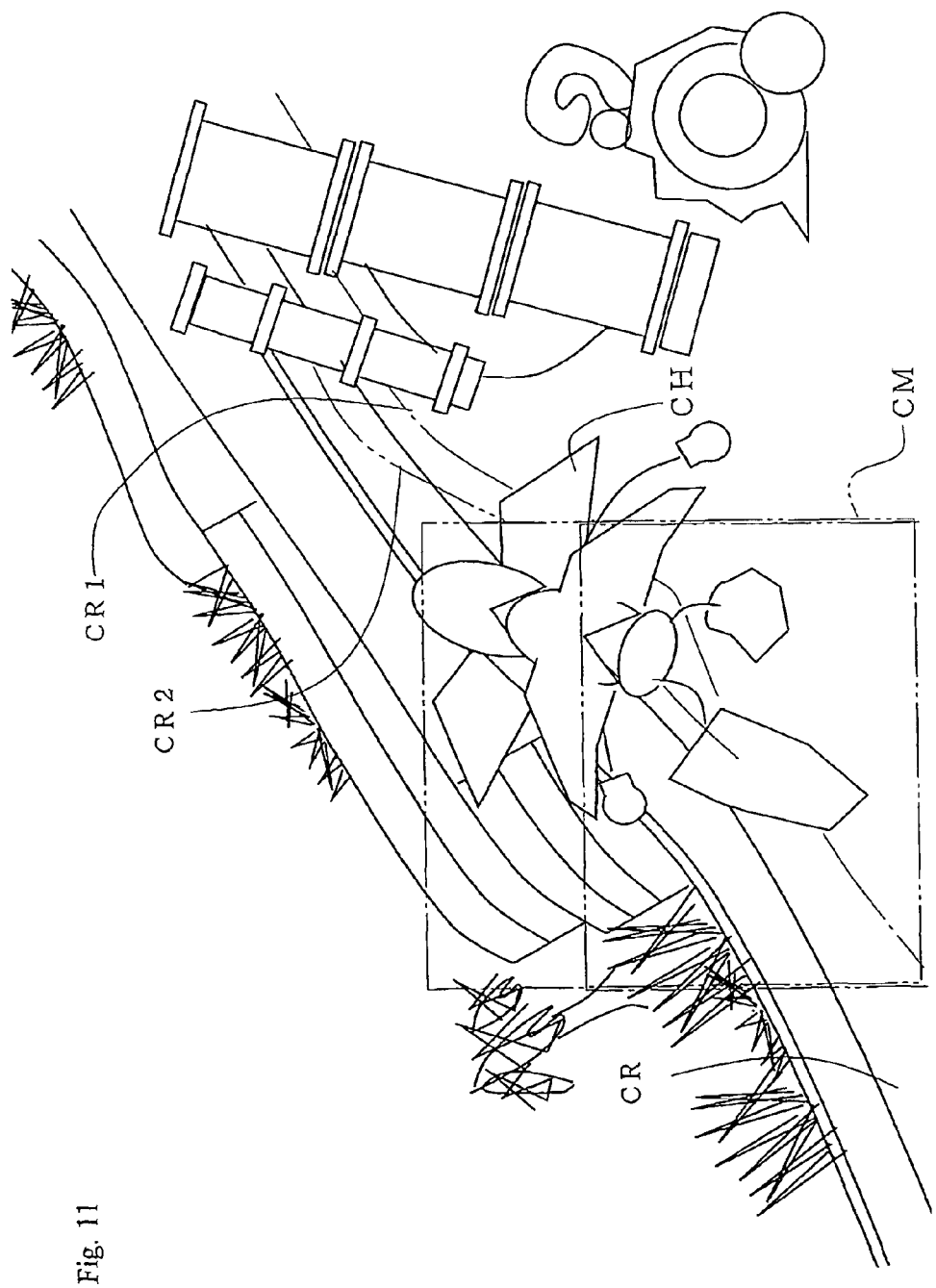
FIG. 11 is a figure showing an image photographed by the virtual camera in the game executed on the game machine in FIG. 1.
Figure 12:
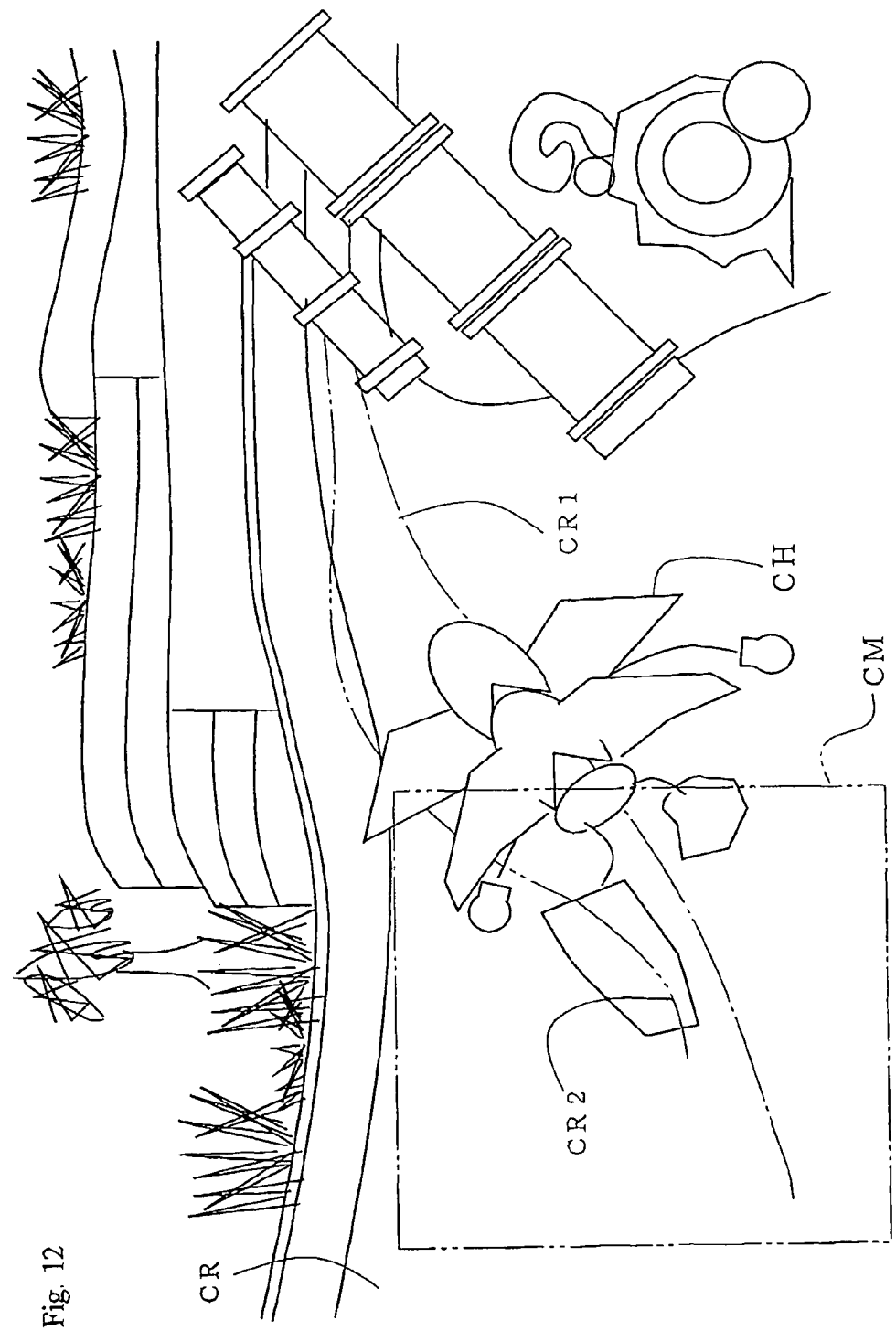
FIG. 12 is a figure showing another image photographed by the virtual camera in the game executed on the game machine in FIG. 1.
Figure 13:
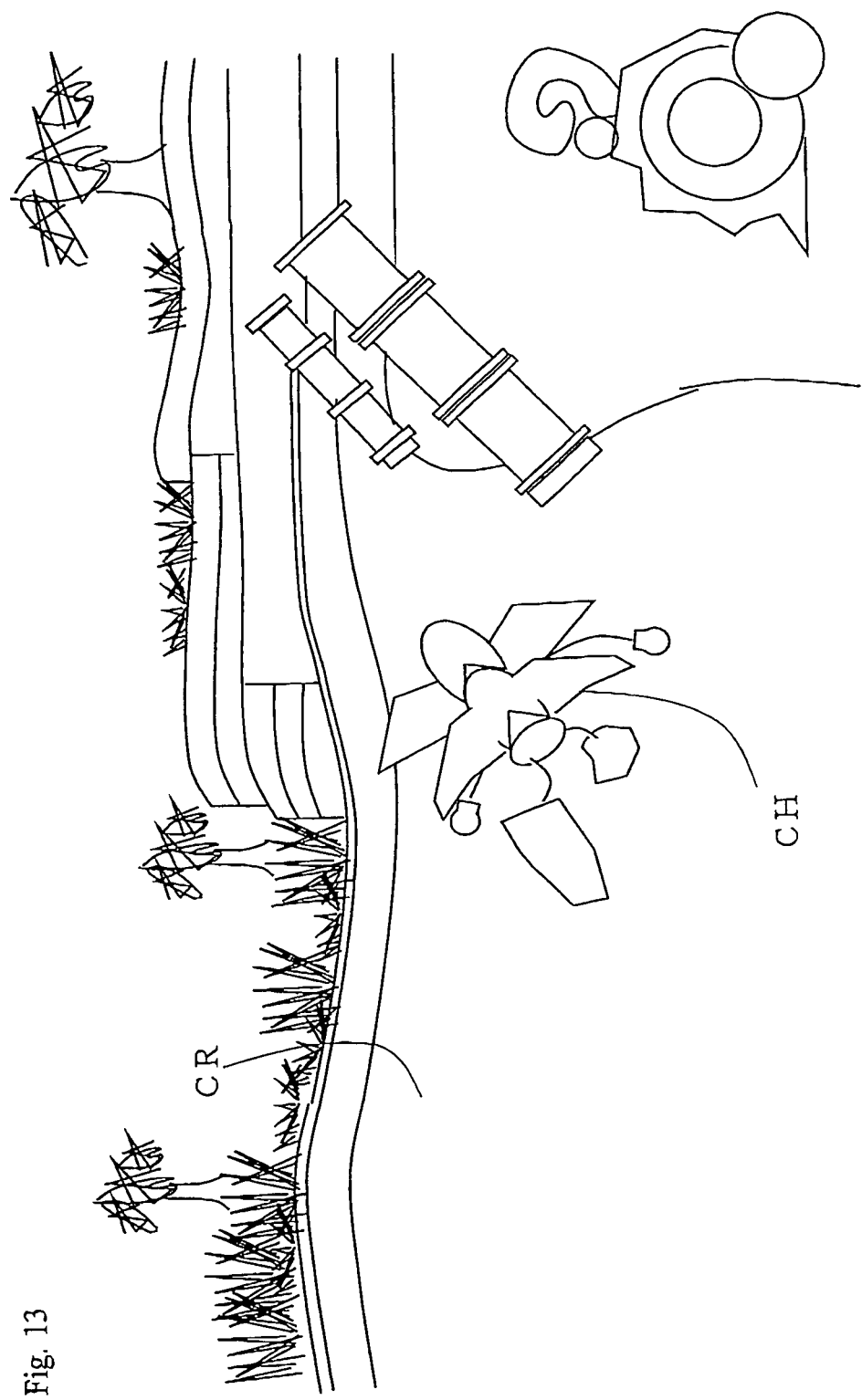
FIG. 13 is a figure showing further another image photographed by the virtual camera in the game executed on the game machine in FIG. 1.

FIG. 11 is a figure showing an image photographed by the virtual camera in the game executed on the game machine in FIG. 1. FIG. 12 is a figure showing another image photographed by the virtual camera in the game executed on the game machine in FIG. 1. FIG. 13 is a figure showing further another image photographed by the virtual camera in the game executed on the game machine in FIG. 1.

In the image of FIG. 11, the reference axis AX is set to be parallel to the Y-axis of the virtual space SP, and virtual camera CM shows the player character CH and circumstance around the player character, viewing from the backside of the player character CH.

On the other hand, in the image of FIG. 12, the reference axis AX is inclined along an inclination of the course, and the image is substantially expressed as if it were seen at a view point of the player character. Therefore, a movement of the player character CH running in high speed bearing the centrifugal force.

In a image of FIG. 13, the view angle δ is more than that of FIGS. 11 and 12 so that a circumstance of wide range is shown. So, the game situation is shown from more objective point of view.

As mentioned above, situation of the object moving in the virtual space is well informed, a dynamic image is shown and the virtual camera is freely set.

In the above embodiment, the CPU 1000, system memory 1020, video display processor 1030 and graphic memory 1040 cooperatively function as a virtual space generating means for generating the virtual space SP and as an object generating means for generating the object CH.

The CPU 1000, system memory 1020 and controller 2100 cooperatively function as a movement operation means for moving the object CH along the reference moving path CR1.

The CPU 1000 and system memory 1020 cooperatively function as a reference path generating means for generating the reference moving path CR1 of the object CH, as a virtual camera generating means for generating the virtual camera which sets the image of the virtual space SP to be displayed, as a calculation means of object corresponding position for calculating object corresponding position CP corresponding to the position CH(X,Y,Z), as a virtual camera setting means for setting the position CM and photographing condition, as a first angle setting means for setting the 1st rotational angle αc around the first coordinate axis Xc, as a second angle setting means for setting the 2nd rotational angle βc around the second coordinate axis Yc, as a third angle setting means for setting the 3rd rotational angle γc around the third coordinate axis Zc, as an inclination setting means for setting an inclination of the reference axis AX in the virtual space SP, and as a view angle setting means for setting the view angle δc.

Figure 14:
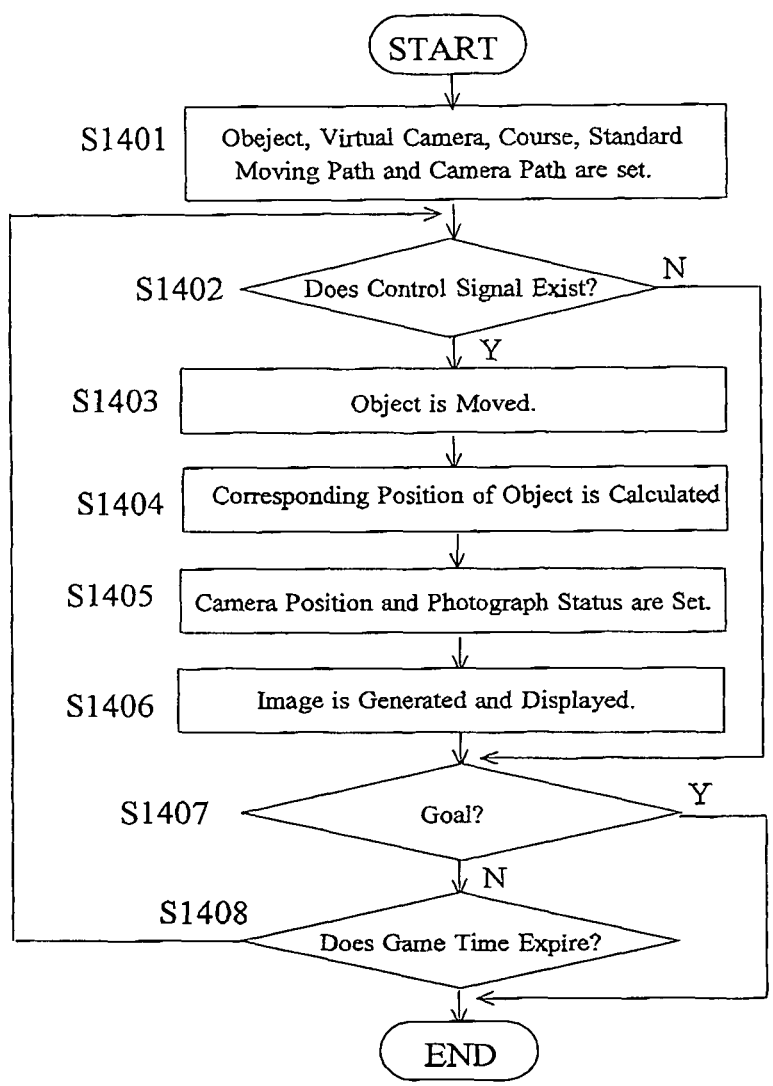
FIG. 14 is a flow chart showing an embodiment of a image processing program according to the present invention.

The above image processing is executed in the game machine (image processing apparatus) 2000 by means of an image processing program in FIG. 14. The image processing program executes the following steps.

Step S1401: First, the object CH, virtual camera CM, course CR and reference moving paths CR1 and CR2 are set, and the processing is advanced to the step S1402.

Step S1402: It is judged whether a control signal for moving the object CH is input from the controller 2100 or not. When the control signal is input, the processing is advanced to the step S1402, otherwise to the step S1407.

Step S1403: The object CH is moved and the processing is advanced to the step S1404.

Step S1404: The object corresponding position CP is calculated and the processing is advanced to the step S1405.

Step S1405: The position and the photographing condition of the virtual camera CM is set and the processing is advanced to the step S1406.

Step S1406: An image is generated and displayed and the processing is advanced to the step S1407.

Step S1407: It is judged whether the object CH reaches the goal or the game finishes due to other causes. When the game finishes, the processing is immediately terminated, otherwise, the processing is advanced to the step S1409.

Step S1408: It is judged whether the game time expires or not. When the game time expires, the processing is immediately terminated, otherwise, the processing is returned to the step S1402.

The image processing program of FIG. 14 is read from a memory medium or communication medium to the system memory 1020.

When the image processing program is executed by a general purpose computer, the program code is read from a memory medium or communication medium to a system memory of the computer, which let the computer execute the image processing program.

In the above embodiment, a game is described, in which one object runs along a course. However, the present invention is applicable to any games in which one or more objects move in a virtual space, for example, to a flight simulator.

The invention claimed is:
1. An image processing apparatus, comprising,
    virtual space generating means for generating a virtual space;
    object setting means for setting an object in said virtual space;
    virtual viewpoint setting means for setting a display image in said virtual space;
    movement path setting means for setting a reference movement path for said object in a course on which said object moves in said virtual space;
    movement operation means for moving said object on the course in said virtual space; and
    object-corresponding position calculating means for calculating an object-corresponding position on said reference movement path corresponding to an actual position of said object on the course; and
    wherein said object-corresponding position and said actual position differ for at least a portion of the course on which said object moves;
    wherein said virtual viewpoint setting means sets a virtual viewpoint position and an image rendering state thereof, the virtual viewpoint position differing from said object-corresponding position while having a correspondence with said object-corresponding position, thereby allowing display of the display image including said object; and
    wherein said object-corresponding position is a point on said reference movement path nearest from the actual position of said object.

2. An image processing apparatus according to claim 1, wherein
    said virtual viewpoint setting means sets the position of said virtual viewpoint along a continuous viewpoint path corresponding to at least a part of said object-corresponding position.

3. An image processing apparatus according to claim 1, wherein
    said virtual viewpoint setting means intermittently sets the position of said virtual viewpoint for each prescribed range in at least a part of said object-corresponding position.

4. An image processing apparatus according to claim 1, wherein said virtual viewpoint setting means comprises:
    first angle setting means for setting a first rotary angle around a first coordinate axis perpendicular to a line-of-sight axis or said virtual viewpoint and a reference axis in a three-dimensional direction of the virtual space;
    second angle setting means for setting, a second rotary angle around a second coordinate axis perpendicular to the line-of-sight axis of said virtual viewpoint and parallel to said reference axis;
    third angle setting means for setting a third rotary angle around a third coordinate axis perpendicular to said first and second coordinate axes; and
    inclination setting means for setting the inclination of said reference axis in said virtual space.

5. An image processing apparatus according to claim 1, wherein
    said virtual viewpoint setting means comprises virtual viewpoint rendering range setting means for setting the rendering range of said virtual viewpoint.

6. An image processing apparatus according to claim 1, wherein said actual position of the object on the course during said moving is off the reference movement path for at least said portion of the course;
    wherein said object-corresponding position calculating means calculates said object-corresponding position so as to be on said reference movement path at a location nearest to said actual position of said object on the course;
    wherein said actual position and said object-corresponding position differ; and
    wherein said virtual viewpoint setting means sets the virtual viewpoint based upon said object-corresponding position for use in displaying the display image including said object while the object setting means sets; the object within the display image at said actual position of the object.

7. An image processing method, comprising,
generating a virtual space;
setting an object in said virtual space;
setting a virtual viewpoint in order to set a display image iii said virtual space;
setting a reference movement path for said object in a course on which said object moves in said virtual space;
moving said object on the course in said virtual space; and
calculating an object corresponding position on said reference movement path corresponding to an actual position of said object on the course; and
wherein said object-corresponding position and said actual position differ for at least a portion of the course on which said object moves;
wherein said setting the virtual viewpoint is for setting a position of said virtual viewpoint and an image rendering state thereof in correspondence with said object-corresponding position, thereby allowing display of the display image including said object; and
wherein said setting the virtual viewpoint is for setting a position of said virtual viewpoint an image rendering state thereof in which the virtual viewpoint position differs from said object-corresponding position while having a correspondence with said object-corresponding position, thereby allowing display of the display image including said object;
wherein said object-corresponding position is a point on said reference movement path nearest from the actual position of said object.

8. An image processing method according to claim 7, wherein
said setting a virtual viewpoint is for setting the position of said virtual viewpoint along a continuous viewpoint path corresponding to at least a part of said object-corresponding position.

9. An image processing method according to claim 7, wherein
said setting a virtual viewpoint is for intermittently setting the position of said virtual viewpoint for each prescribed range in at least a part of said object-corresponding position.

10. An image processing method according, to claim 7, wherein
said setting a virtual viewpoint comprises,
setting a first rotary angle around a first coordinate axis perpendicular to a line-of-sight axis of said virtual viewpoint and a reference axis in the three-dimensional direction of the virtual space;
setting a second rotary angle around a second coordinate axis perpendicular to the line-of-sight axis of said virtual viewpoint and parallel to said reference axis;
setting a third rotary angle around a third coordinate axis perpendicular to said first and second coordinate axes; and
setting an inclination of said reference axis in said virtual space.

11. An image processing method according, to claim 7,
wherein said actual position of the object on the course during said moving is off the reference movement path for at least said portion of the course;
wherein said object-corresponding position calculating means calculates said object-corresponding position so as to be on said reference movement path at a location nearest to said actual position of said object on the course;
wherein said actual position and said object-corresponding position differ; and
wherein said virtual viewpoint setting means sets the virtual viewpoint based upon said object-corresponding position for use in displaying the display image including said object while the object setting means sets the object within the display image at said actual position of the object.

12. A non-transitory computer readable medium on which is stored program code executable by a processor for performing a method comprising:
generating a virtual space;
setting an object in said virtual space;
setting a virtual viewpoint in order to seta display image in said virtual space;
setting a reference movement path for said object in a course on which said object moves in said virtual space;
moving said object on the course in said virtual space; and
calculating an object corresponding position on said reference movement path corresponding to an actual position of said object on the course; and
wherein said object-corresponding position and said actual position differ for at least a portion of the course on which said object moves;
wherein said setting the virtual viewpoint is for setting a position or said virtual viewpoint and an image rendering state thereof in which the virtual viewpoint position differs from said object-corresponding position while having a correspondence with said object-corresponding position, thereby allowing display of the display image including said object; and
wherein said object-corresponding position is a point on said reference movement path nearest from the actual position of said object.

13. A non-transitory computer readable medium according to claim 12, wherein
said setting a virtual viewpoint is for setting the position of said virtual viewpoint along a continuous viewpoint path corresponding to at least a part of said object-corresponding position.

14. A non-transitory computer readable medium according to claim 12, wherein
said setting a virtual viewpoint is for intermittently setting the position of said virtual viewpoint for each prescribed range in at least a part of said object-corresponding position.

15. A non-transitory computer readable medium according, to claim 12, wherein
said setting a virtual viewpoint comprises
setting a first rotary angle around a first coordinate axis perpendicular to a line-of-sight axis of said virtual viewpoint and a reference axis in the three-dimensional direction of the virtual space;
setting a second rotary angle around a second coordinate axis perpendicular to the line-of-sight axis of said virtual viewpoint and parallel to said reference axis;
setting a third rotary angle around a third coordinate axis perpendicular to said first and second coordinate axes; and
setting an inclination of said reference axis in said virtual space.

16. A non-transitory computer readable medium according to claim 12 wherein said actual position of the object on the course during said moving is off the reference movement path for at least said portion of the course;

wherein said object-corresponding position calculating means calculates said object-corresponding position so as to be on said reference movement path at a location nearest to said actual position of said object on the course;

wherein said actual position and said object-corresponding position differ; and wherein said virtual viewpoint setting means sets the virtual viewpoint based upon said object-corresponding position for use in displaying the display image including said object while the object setting means sets the object within the display image at said actual position of the object.

* * * * *